United States Patent [19]

Bruning

[11] 4,190,352

[45] Feb. 26, 1980

[54] METHOD AND APPARATUS FOR CONTINUOUSLY PATTERNING A PHOTOSENSITIVE TAPE

[75] Inventor: John H. Bruning, Brookside, N.J.

[73] Assignee: Bell Telephone Laboratories, Incorporated, Murray Hill, N.J.

[21] Appl. No.: 811,971

[22] Filed: Jun. 30, 1977

[51] Int. Cl.² ............... G03B 27/32; G03B 27/10; G03B 27/70
[52] U.S. Cl. .......................... 355/19; 355/26; 355/49; 355/66; 355/110; 355/77
[58] Field of Search ............ 355/19, 26, 46, 47–51, 355/64–66, 77, 8, 11, 57, 60, 104, 110, 117; 350/199, 202; 96/36.2

[56] References Cited

U.S. PATENT DOCUMENTS

| | | | |
|---|---|---|---|
| 1,591,466 | 7/1926 | Capstaff | 355/19 |
| 1,801,450 | 4/1931 | Owens | 355/51 X |
| 2,849,298 | 8/1958 | Werberig | 156/634 |
| 3,562,005 | 2/1971 | DeAngelo et al. | 96/38.2 |
| 3,689,991 | 9/1972 | Aird | 29/557 R |
| 3,751,165 | 8/1973 | Inoue et al. | 355/97 X |
| 3,968,563 | 7/1976 | Hamlin | 33/141 G |
| 3,998,544 | 12/1976 | Pass et al. | 355/48 X |

FOREIGN PATENT DOCUMENTS

758260  8/1953  Fed. Rep. of Germany ............ 355/48

OTHER PUBLICATIONS

*Electronics*, May 16, 1974, pp. 89–95, S. E. Grossman, "Film-carrier Technique Automates the Packaging of IC Chips".
*Solid State Technology*, May 1977, pp. 33–38, R. G. Oswald et al., "Application of Tape Automated Bonding Technology to Hybrid Microcircuits".

*Primary Examiner*—L. T. Hix
*Assistant Examiner*—W. J. Brady
*Attorney, Agent, or Firm*—Maurice de Picciotto; Lucian C. Canepa

[57] ABSTRACT

A method and an apparatus for continuously patterning a photosensitive tape or foil wherein a master pattern and the tape or foil are synchronously coupled. An optical system comprising a plano-convex lens, a concave spherical mirror, and a pair of right-angle prisms is optically-coupled between the master pattern and the tape or foil for projecting an image of the pattern onto the tape. The optical system is such that the movement of the image is in the same direction as the movement of the tape. The apparatus is such that patterning can take place through projecting an image on one or on both sides of the tape. Alternatively, projecting an image on one side of the tape and contact printing of a pattern on the other side of the tape is also made possible by the apparatus.

14 Claims, 8 Drawing Figures

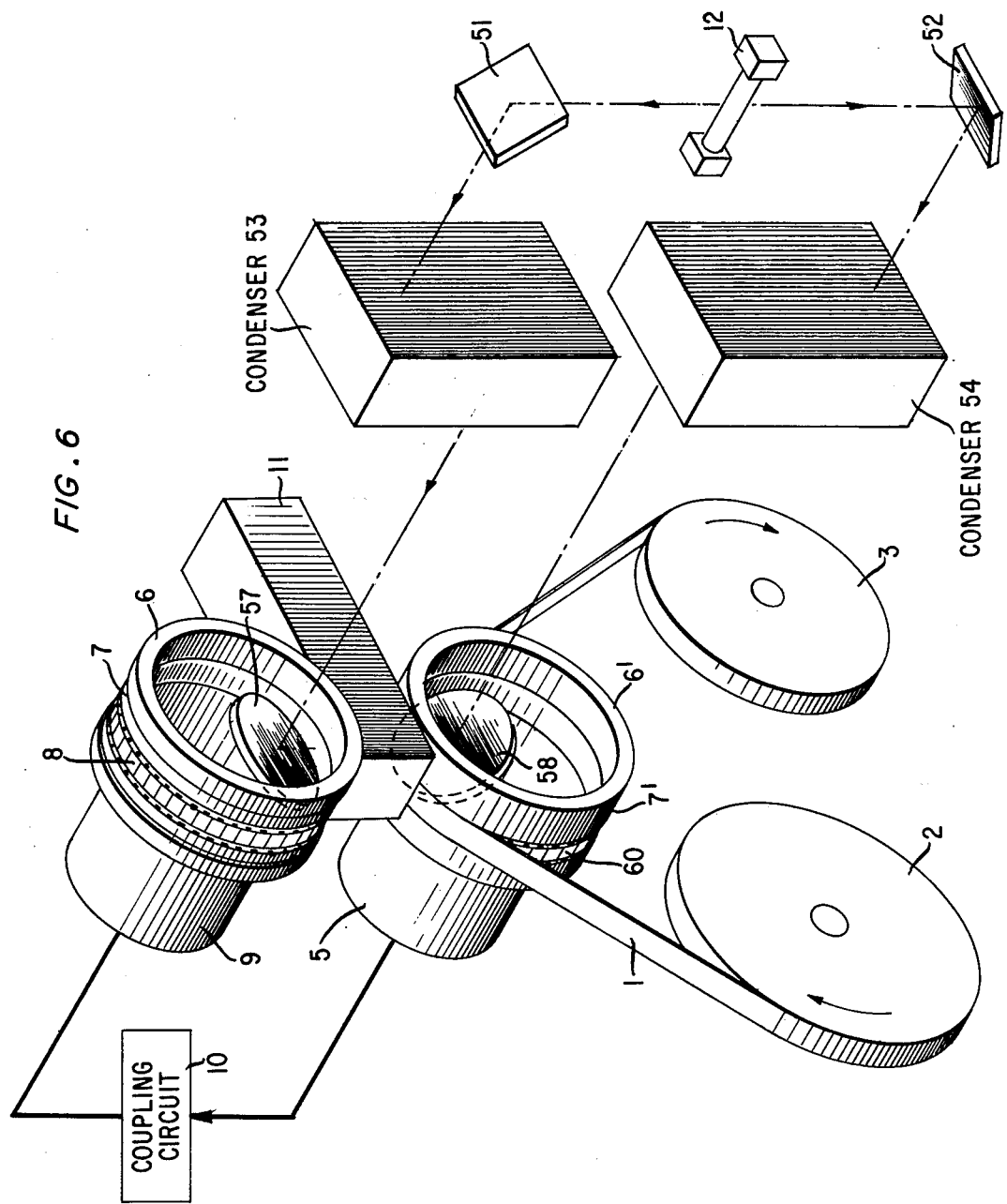

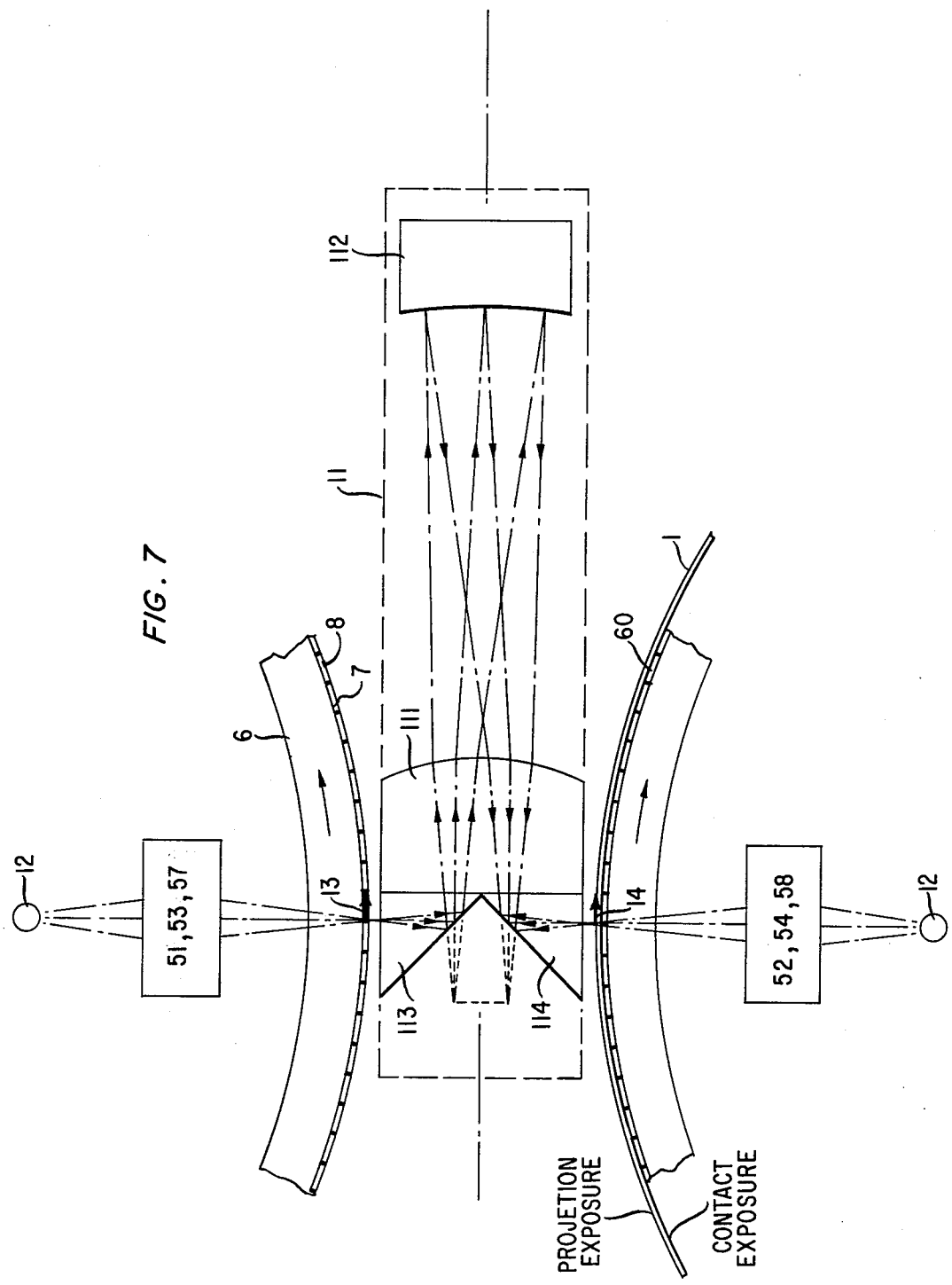

METHOD AND APPARATUS FOR CONTINUOUSLY PATTERNING A PHOTOSENSITIVE TAPE

BACKGROUND OF THE INVENTION

The present invention relates to a method and an apparatus for patterning tapes or foil strips. In particular, the present invention is directed to continuously patterning a photosensitive tape for use as a film carrier for integrated circuit chips.

Up to a few years ago, wire-bonding was the most commonly used method for making connections from an integrated circuit (IC) chip to the outside world. An alternative to wire-bonding consists of using a tape carrier, similar to a movie film, having lead frames formed along its surface. In this film-carrier approach, usually a polyimide film carries a copper lead pattern that repeats itself along the length of the film. The finger-like leads of an individual site on the film are bonded simultaneously to the pads of an IC chip, as for example, described in U.S. Pat. No. 3,689,991 to A. D. Aird, issued Sept. 12, 1972, and U.S. Pat. No. 3,968,563 to A. H. Hamlin, issued July 13, 1976.

These two known processes make use of a thin strip of a continuous electrically insulating tape having a plurality of prepunched apertures at regularly spaced intervals. A thin foil-like strip or layer of electrically conducting material is secured to the tape. By photolithographic masking and etching, portions of the layer are removed to form a plurality of sets of metallic finger-like leads. This subtractive technique, used to form the finger-like leads, is described in an article by S. E. Grossman entitled "Film-carrier Technique Automates the Packaging of IC Chips" in *Electronics*, May 16, 1974, pages 89–95. According to this article, the technique consists in first bonding a 1-ounce copper foil to a polyimide film by means of an adhesive. Photoresist techniques form the image of the desired lead frame in a step-and-repeat fashion along the film-mounted copper laminate. This step-and-repeat projection requires indexing, settling and alignment, all of which are time-consuming and expensive operations. Moreover, such a projection technique is difficult if long lengths of tapes are needed since accelerations associated with high speed indexing are damaging to the fragile tape. Furthermore, the high price-per-pound of the polyimide carrier increases the cost per site of such a tape especially when small quantities of custom tapes are needed.

SUMMARY OF THE INVENTION

The foregoing problems are solved in accordance with an embodiment of the present invention wherein a method for continuously patterning a photosensitive tape comprises the steps of translating the photosensitive tape at a predetermined speed between a tape-feeding source and a tape-receiving source, rotating at the predetermined speed a cylindrical transparent body having on its cylindrical surface a predetermined pattern, optically coupling an optical system between the pattern and the tape, and illuminating the pattern through the transparent body for continuously projecting an image of the pattern onto the tape.

In a particular illustrative embodiment of the present invention, the rotating step comprises the step of synchronously locking the cylindrical body and the tape to each other to within the lens resolution of the optical system. Also, the translating step comprises the step of engaging the tape on a cylindrical drum having its axis parallel to the axis of the cylindrical transparent body.

An illustrative embodiment of an apparatus for continuously patterning a photosensitive tape according to the foregoing method comprises an arrangement for translating the photosensitive tape in a predetermined direction at a predetermined speed between a tape-feeding source and a tape-receiving source, a cylindrical transparent body having its longitudinal axis perpendicular to the predetermined direction and its cylindrical surface adapted to receive a predetermined pattern to be projected, circuitry for synchronously coupling the translating arrangement and the cylindrical body such that the pattern rotates at the predetermined speed, and an optical system for projecting an image of the pattern onto the tape, whereby the movement of a projected image is in the predetermined direction.

One object of the present invention is to achieve a highly accurate method and an apparatus for continuously patterning a photosensitive tape or foil.

Another object of the present invention is to achieve a high-speed continuous patterning process of a tape or foil by means of projection exposure techniques.

Another object of the present invention is to realize a projection exposure system having a very long mask life.

Another object of the present invention is to realize a method and an apparatus for patterning a photosensitive tape or foil while preventing undue tensions on the tape or foil during the patterning process.

A further object of the present invention is to achieve a simple, flexible and high-speed projection exposure system for photosensitive tapes or foils.

A still further object of the present invention is to continuously pattern a photosensitive tape or foil, thereby preventing the tape or foil from breaking and achieving an economically attractive projecting process.

These and other objects and advantages of this invention will appear more fully upon consideration of the various illustrative embodiments now to be described in detail in connection with the accompanying drawings.

BRIEF DESCRIPTION OF THE DRAWING

FIG. 6 shows a further illustrative embodiment of an apparatus according to the present invention;

FIG. 7 is an enlarged view of a portion of the apparatus shown in FIG. 6 including its optical system.

DETAILED DESCRIPTION

Figure 1:
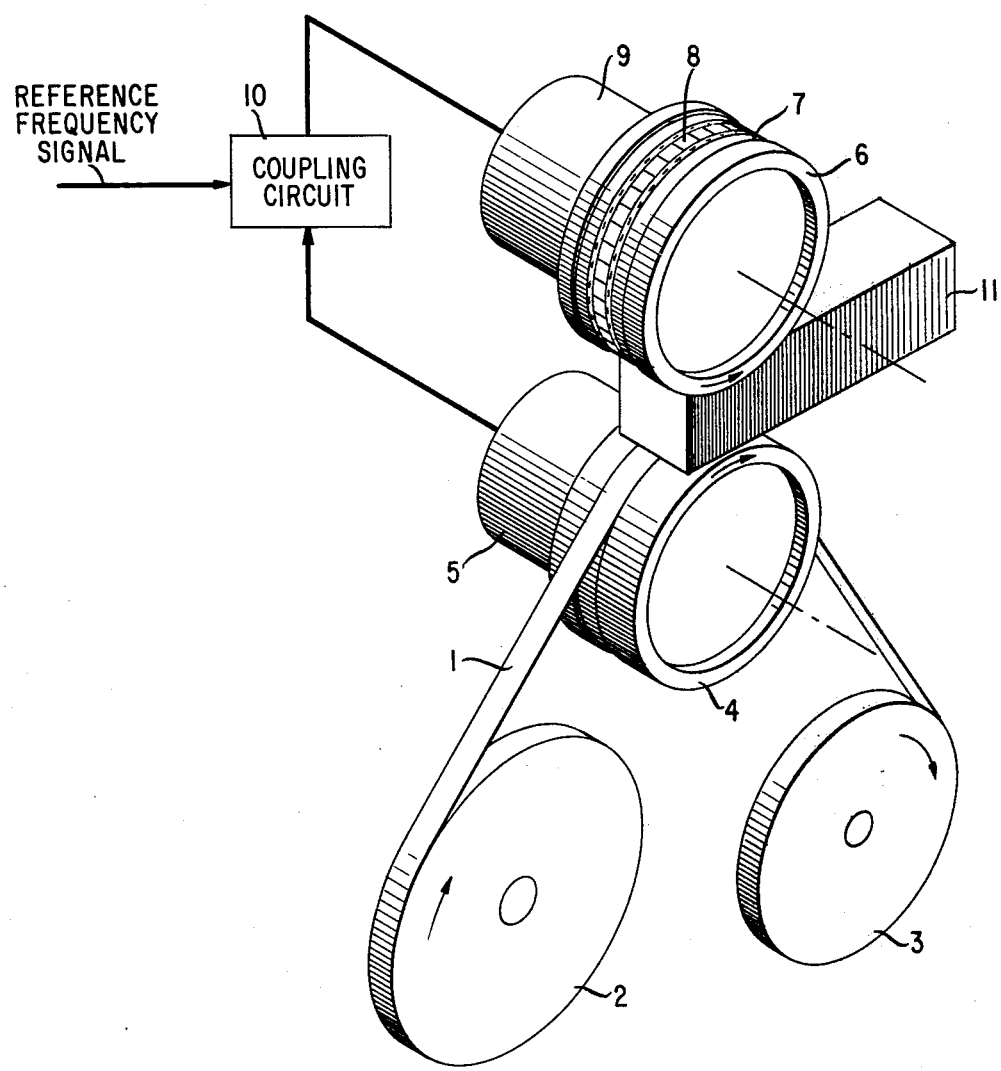
FIG. 1 shows an illustrative embodiment of an apparatus made according to the present invention.

Referring now to an illustrative embodiment of the invention, as shown in FIG. 1, an apparatus for continuously patterning a photosensitive tape 1 comprises a tape-feeding reel 2, a tape-receiving reel 3, and a tape-translating drum 4 for translating the tape 1 at a predetermined speed and in a predetermined direction between reels 2 and 3. The drum 4 is mechanically coupled to a driving mechanism 5 comprising, for example, a motor having its shaft directly coupled to the drum 4. However, other translating mechanisms may be substituted for drum 4, as will be explained in connection with another illustrative embodiment of the invention, without departing from the spirit and scope of the present invention. A cylindrical transparent body 6 is positioned with its longitudinal axis perpendicular to the direction of translation of tape 1 on the drum 4. In other words, in the embodiment of FIG. 1, the axes of body 6 and drum 4 are parallel. Transparent cylindrical body 6 carries on its cylindrical surface 7 a predetermined pattern or mask 8 to be projected on the photosensitive tape 1.

The pattern 8 may be formed directly on the cylindrical surface 7 by first coating the surface with a thin metal film and then selectively removing portions thereof by thermal machining of the film. Another alternative for depositing pattern 8 onto the cylindrical surface 7 consists in first producing a predetermined pattern on a 16 mm or 35 mm filmstrip by means of conventional techniques. The filmstrip comprising a plurality of individual frames or patterns could be wrapped around the cylindrical body 6 and held by vacuum against the surface 7. Both ends of the filmstrip would be butted to produce a contiguous set of patterns on the cylindrical surface 7. The cylindrical body 6 is mechanically coupled to a driving mechanism 9 comprising, for example, a motor having its shaft directly coupled to the body 6.

In accordance with the principles of the present invention, the cylindrical transparent body 6 and the drum 4 are synchronously coupled by means of a coupling circuit 10 responsive to a reference frequency signal $f_o$. The coupling circuit 10 may comprise a pair of phase-locked loops arranged such that the cylindrical transparent body 6 is the "slave". Thus, both cylinders 4 and 6 rotate at precisely the same rate but in opposite directions as shown by the arrows in FIG. 1. In effect, an electrical link exists between drum 4 and cylinder 6 resulting in locking of both cylinders to each other. The apparatus according to the present invention further comprises an optical system 11 positioned between cylindrical body 6 and drum 4 for projecting an image of the pattern 8 onto the tape 1. The optical system 11 may be positioned as shown in FIG. 1 between body 6 and drum 4, or may be rotated by a 90-degree angle such that its axis is parallel to the axes of the body and the drum. In the latter, object and image have the same orientation in the direction of the width of tape 1, but have opposite orientation in the longitudinal direction of tape 1. Also, object and image would be offset in the latter direction.

Figure 2:
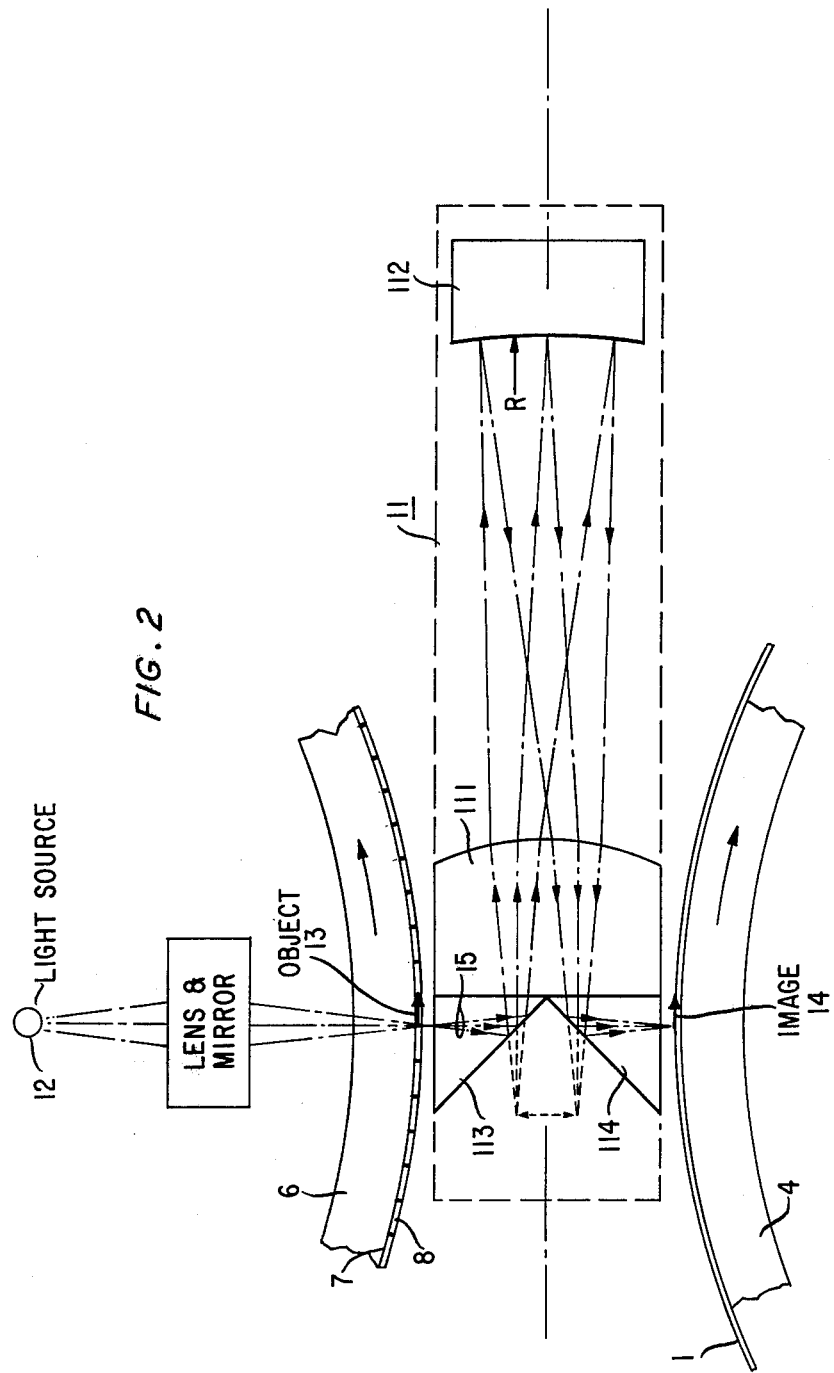
FIG. 2 is an enlarged view of a portion of the apparatus shown in FIG. 1 including its optical system.

Shown in FIG. 2 is an enlarged portion of the illustrative embodiment of FIG. 1, including the structural details of the optical system 11. By way of background, a known one-to-one imaging optical system is described in an article by J. Dyson entitled "Unit Magnification Optical System without Seidel Aberrations," published in *Journal of the Optical Society of America*, Volume 49, No. 7, July 1959, pages 713–716. This known Dyson system consists of two components, namely, a concave spherical mirror of radius R, and a thick plano-convex lens of radius r, index n and thickness equal to r. The centers of curvature of both spherical surfaces are substantially coincident, and r is chosen so that parallel rays incident on the plano surface are focused on the mirror surface, i.e., $$\frac{r}{R} = \frac{n-1}{n}$$

In this known system, object and image surfaces lie on or close to the plane face of the lens, and object and image are of opposite directions.

In accordance with the principles of the present invention, the optical system 11 of FIG. 2 is a modified Dyson-type system comprising to plano-convex lens 111 of radius r and index n and a spherical concave mirror 112 of radius r having substantially coincident centers of curvature. The plane face of the plano-convex lens 111 is cemented to two right-angle prisms 113 and 114 in order to bring object and image to usable positions. The pattern 8 to be imaged on the tape 1 is placed or formed on the cylindrical transparent body 6 which is made, for example, of quartz. A narrow strip of this pattern 8 is imaged by the system onto the photosensitive resist coated tape which is held in the proper focal plane by the lower drum 4. If the two drums 4 and 6 rotate in synchronism, the pattern 8 is continuously transferred to the resist coated tape 1. The optical system 11 can image the full tape width, and utilizes a very small field size in the scan direction. The narrow stripe object and image can thus lie close to the optical axis obviating the need for a beamsplitter. This permits an optical system design completely made of fused silica with its attendant high transmission in the ultraviolet range. The optical system 11 is telecentric and hence insensitive to first-order distortions due to focal phane shifts. Since the design is completely symmetric, distortion, coma, and lateral color are zero. Resolution is nearly diffraction limited over a 2 mm×16 mm field at F/2.5 and still has acceptable resolution at a 2×22 mm field at F/4. Resolution in all cases is better than 5 μm which is adequate for lead patterns whose narrowest feature would be larger than 50 μm. Over the range of 3000–4400 Angstroms the optical system is nearly achromatic.

Illumination is provided, for example, by a 1 kW water-cooled mercury capillary arc 12. However, other light sources may be used without departing from the spirit and scope of the invention. Water cooling filters out most of the infrared radiation beyond 1 μm and assures cool operation. A combination of lenses and mirrors schematically shown in FIG. 2, is coupled to the arc for directing the arc's rays onto the cylindrical surface 7. The operation of the optical system is such that an object 13 that is part of the pattern 8, when illuminated by light source 12, is projected onto an image plane corresponding to the tape 1. The incoming object radiations 15 are first reflected by right-angle prism 113 and directed to lens 111 and mirror 112. The rays from mirror 112, after reflection by right-angle prism 114, are directed to the tape 1 to form the image 14 thereon. As shown in FIG. 2, object 13 and image 14 have the same orientation in the direction of translation of the tape 1. However, in a direction corresponding to the width of the tape, i.e., in a plane perpendicular to the page in FIG. 2, there is an inversion between object and image. Furthermore, as the pattern 8 rotates, the movement of the image 14 is in the same direction as the movement of the tape 1, thus enabling a continuous projection patterning of the tape.

Since in the present case, scanning of the pattern takes place in the direction of movement of the tape 1, there is no inversion in the scanning direction and no need for image reversion.

Figure 3:
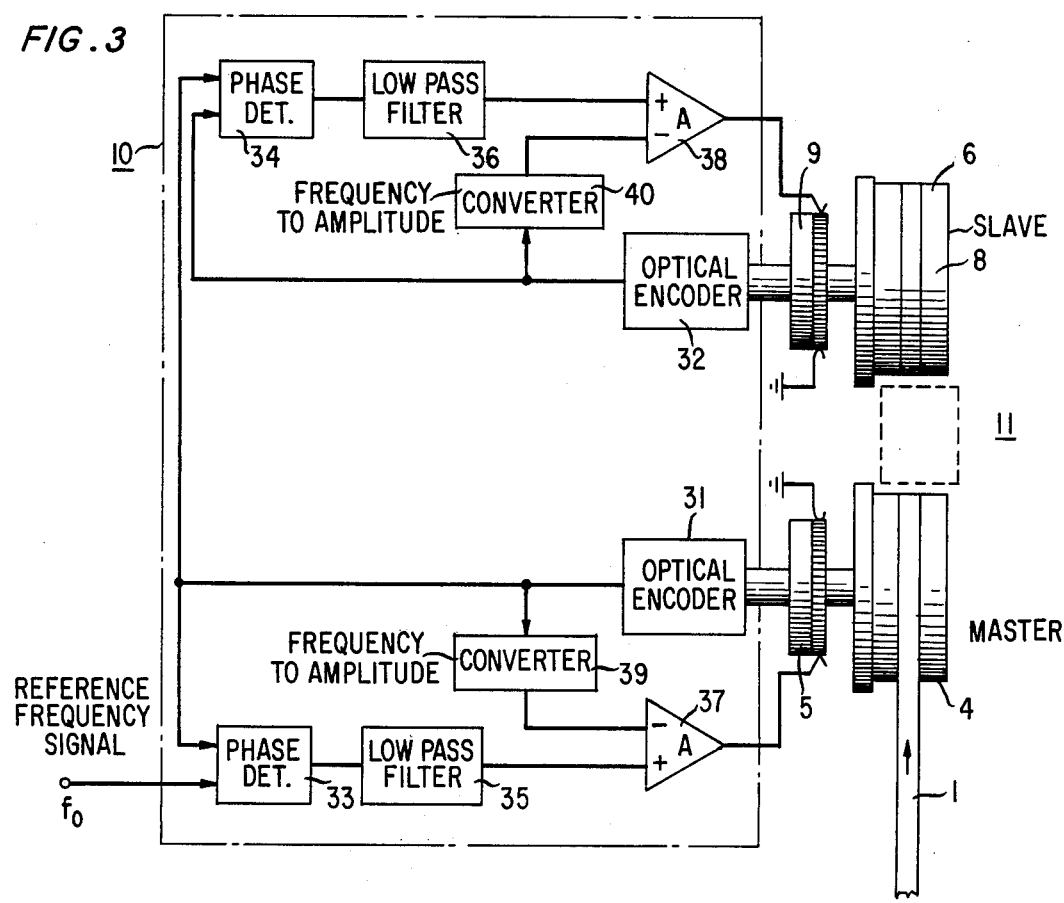
FIG. 3 shows a circuit diagram of the phase-locking system of the apparatus shown in FIG. 1.

As described above, the tape-carrying drum 4 and the cylindrical transparent body 6 are synchronously coupled by means of coupling circuit 10. The latter is schematically illustrated in FIG. 3 wherein the drum 4 and the cylindrical body 6 are mechanically driven by electric motors 5 and 9, respectively. The drum 4 and the body 6, in accordance with the principles of the present invention, must rotate at precisely the same rate, but in opposite directions. Moreover, the drum 4 and the body 6 are locked to each other within the lens resolution of the optical system on the circumference, i.e., within less than 5 $\mu$m. This corresponds to a rotational tolerance of approximately 20 arc seconds. By using precision optical encoders 31 and 32 and phase-locked loop techniques, the body 6 can move with respect to the tape-carrying drum 4 with a speed accuracy of 0.001%. In this illustrative embodiment, the drum 4 is locked to a predetermined speed by means of a reference frequency signal $f_o$ coupled to one input terminal of phase detector 33. The other input terminal of the phase detector 33 is coupled to the output terminal of optical encoder 31. A low-pass filter 35 has its input terminal coupled to the phase detector 33 output terminal, and its output terminal coupled to one input terminal of operational amplifier 37. The other input terminal of operational amplifier 37 is coupled to the output terminal of optical encoder 31 via a frequency-to-amplitude converter 39. The output terminal of amplifier 37 is coupled to the driving motor 5 of the tape-carrying drum 4. The upper half of the coupling circuit 10 coupled to the cylindrical transparent body 6 and its driving motor 9 is identical to the lower half of the loop 10, i.e., it comprises a phase detector 34, a low-pass filter 36, an operational amplifier 38 and a frequency-to-amplitude converter 40.

In this illustrative embodiment of the coupling circuit, the motion of tape-carrying drum 4 serves as the "master". The output of the optical encoder 31 serves as the reference frequency to which the cylindrical transparent body 6 is the "slave". Thus, low frequency torque disturbances on the drum 4 are tracked by the body 6, and high frequencies are damped by the inertia of the loop and motors. The system comprising the drum 4, the body 6, the motors 5 and 9, and the coupling circuit 10 is stiff enough so that torque disturbances of several ounces in the tape disturb the tape position by less than the image resolution. In the illustrative embodiment of the coupling circuit 10, the reference frequency signal $f_o$ is, for example, a 1000 Hz signal and the optical encoders 31 and 32 are 16-bit encoders generating $2^{16}$ or 65,536 pulses/revolution. The phase detectors 33 and 34, the filters 35 and 36, the amplifiers 37 and 38, and the converters 39 and 40 may be selected from conventional and commercially available components.

In accordance with the principles of the present invention, the tape-carrying drum 4 and the cylindrical transparent body 6 can both be the "slaves" of the reference frequency signal $f_o$. This is achieved by coupling the reference signal $f_o$ to phase detectors 33 and 34, and by connecting the optical encoder 31 output signal only to the other input terminal of phase detector 33. Thus, instead of having a "master-slave" arrangement as shown in FIG. 3, the drum and the body would be "slaves" and locked to $f_o$.

Figure 4:
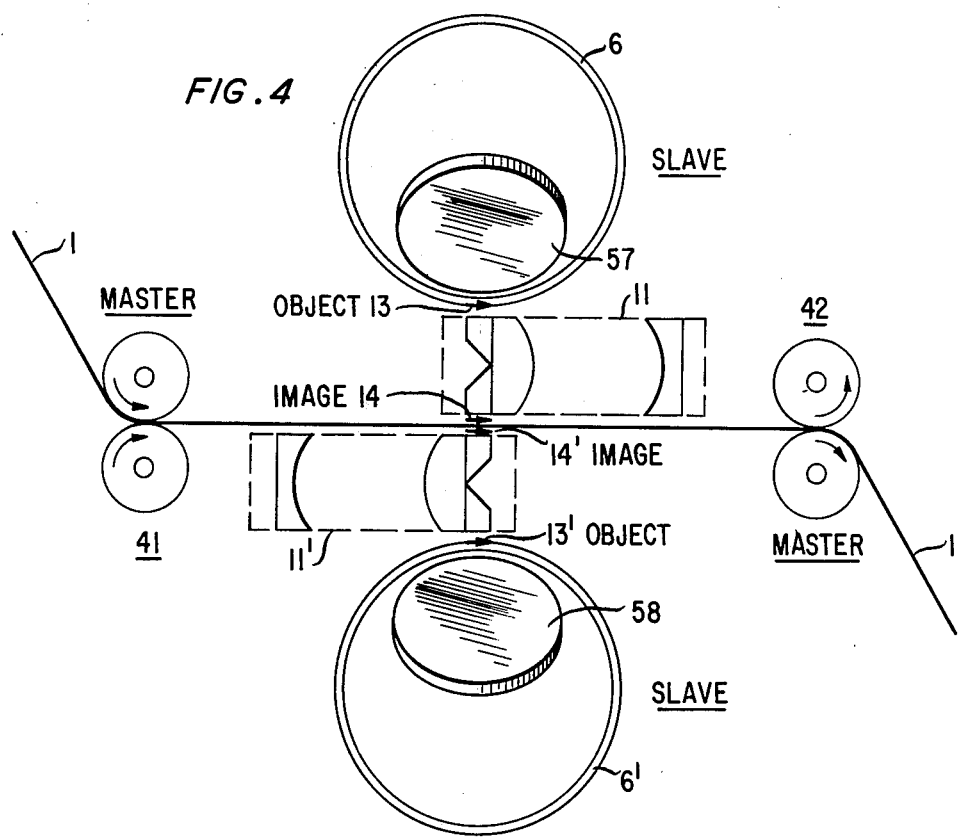
FIGS. 4 and 5, respectively, illustrate a front and side view of another illustrative embodiment of an apparatus made according to the present invention.
Figure 5:
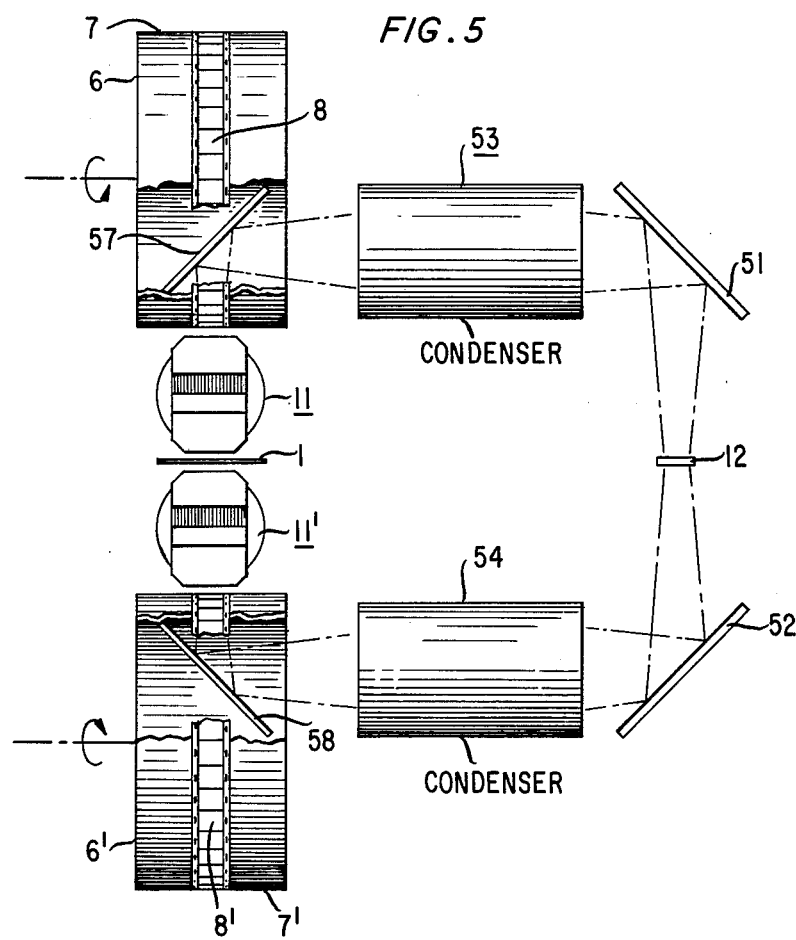

Another illustrative embodiment of the present invention for patterning both sides of a photoresist coated tape is shown in FIGS. 4 and 5. The apparatus for projecting an image onto the continuous tape 1 comprises the first cylindrical transparent body or drum 6 having on its cylindrical surface 7 the predetermined pattern 8 to be projected. A first optical system 11 is positioned between the drum 6 and the tape 1 as described in connection with the embodiment shown in FIG. 1. In order to achieve projection printing onto the other side of photosensitive tape 1, a second cylindrical transparent drum 6' is positioned with its longitudinal axis parallel to the axis of drum 6. A second predetermined pattern 8' is formed on cylindrical surface 7' of drum 6'. A second optical system 11' identical to the optical system 11, is positioned between the drum 6' and the tape 1. Photosensitive tape 1 is translated at a constant and predetermined speed by means of guiding rolls 41 and 42 between a tape-feeding reel and a tape-receiving reel (not shown). In accordance with the principles of the present invention, the motion of guiding rolls 41 and 42 serves as the "master" reference frequency in the phase-locked loops of FIG. 3. Both drums 6 and 6', rotating in opposite directions, are locked to the guiding rolls 41 and 42 and are, therefore, the "slaves" in the coupling circuit 10 of FIG. 3.

As shown in FIG. 5, in order to achieve simultaneous and continuous projection of patterns 8 and 8' onto both sides of the tape 1, double-sided illumination of the tape is required. This may be realized by using a single light source 12, such as a 1 kW water-cooled mercury capillary arc, coupled to a pair of mirrors 51 and 52 for directing the radiations from source 12 toward the patterns 8 and 8' on drums 6 and 6'. The foregoing is achieved by interposing a condenser 53 and a mirror 57 between mirror 51 and pattern 8. Also, another condenser 54 and a second mirror 58 are interposed between mirror 52 and pattern 8' of drum 6'. Condensers 53 and 54 may, for example, comprise all reflecting optical components such as a spherical concave mirror for receiving the radiations reflected by mirrors 51 or 52, and a spherical convex mirror for reflecting the incoming radiations from the concave mirror and directing them to the mirrors 57 or 58. However, other types of condensers may be used without departing from the spirit of the invention. Both mirrors 57 and 58 are positioned within the transparent drums 6 and 6' in order to reflect the incoming radiations from source 12 by a 90-degree angle. With the arrangement shown in FIG. 5, illumination for tape exposure from both sides is available from the same source 12. Both drums 6 and 6' are preferably made of quartz ground and polished to high accuracy. The quartz drums 6 and 6' have, for example, a 15-inch circumference which is a convenient multiple of standard tape pitches. As explained in connection with the embodiment of FIG. 1, the patterns 8 and 8' may be formed, for example, directly on surfaces 7 and 7' by thermal machining. Alternatively, patterns 8 and 8' may be formed on a filmstrip wrapped around the drums 6 and 6' and held by vacuum against surfaces 7 and 7'. However, other means of forming a pattern onto a cylindrical surface can be used without departing from the teaching of the present invention.

Referring now to FIGS. 6 and 7, wherein double-sided patterning of photosensitive tape 1 is shown, identical numerals corresponding to the numerals of the previous figures are utilized to illustrate the similarities of the illustrative embodiments. In this illustrative embodiment, topside exposure of photosensitive tape 1 is obtained by projection printing from the drum 6 of pattern 8 as explained in connection with the previously described embodiments. The back or other side of tape 1 is patterned by means of contact printing of a pattern 60 onto the tape. The pattern 60 on drum 6' and pattern 8 on drum 6 may be identical. However, different patterns may be used when it is desirable to project on both sides of the tape a different beam lead pattern. Contact printing consists of first forming a mask 60 according to conventional mask producing techniques, and wrapping the mask around the cylindrical surface 7' of drum 6'. In this illustrative embodiment, as in the embodiment of FIG. 1, both drums 6 and 6' are synchronously coupled and locked to each other by means of coupling circuit 10. Condensers 53 and 54, as shown in FIG. 6, each comprise all reflecting optical components. It should be noted that other types of optical components can be substituted without departing from teachings of the present invention.

Double-sided exposure either through projection printing as shown in FIG. 4, or through projection printing on one side and contact printing on the other as shown in FIG. 6, is required for etching with negative photoresists. Contact printing requires changing of the mask 60 after a predetermined number of runs. Projection printing, instead, offers the advantage of avoiding contact between the mask and the resist coated tape. The apparatus of FIGS. 6 and 7 enables the combination of these two patterning techniques for double-sided patterning by using only one optical system 11.

Figure 8:
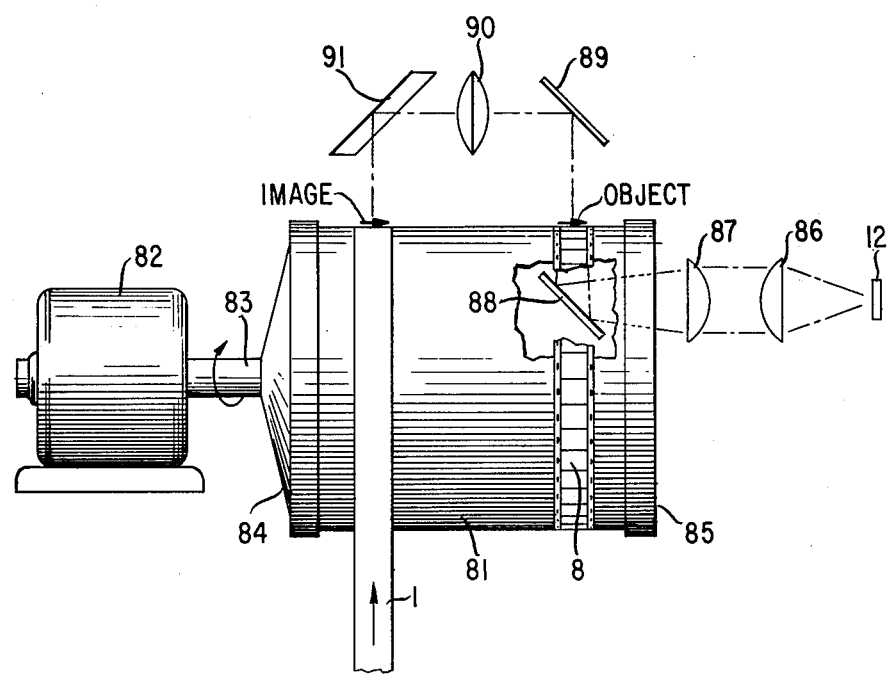
FIG. 8 shows a still further illustrative embodiment of an apparatus according to the present invention.

A still further illustrative embodiment of the present invention is shown in FIG. 8 wherein the photosensitive tape 1 and the predetermined pattern 8 to be projected are driven by the same motor. This illustrative embodiment is useful when single or double sided exposure of the tape is needed. The photosensitive tape 1 and the predetermined pattern 8 are mounted on the same cylindrical transparent drum 81. The drum is rotated at a constant speed by means of a motor 82 having its shaft 83 coupled by means of two end plates 84 and 85 to the cylindrical drum 81. A source of light 12, similar to the one described in connection with the other embodiments, generates radiations that are directed inside the cylindrical drum 81 by means of lenses 86 and 87. A mirror 88 is positioned within the drum 81 for directing the radiations from lens 87 onto the pattern 8. In order to project an image of the pattern onto the photosensitive tape 1, an optical system comprising a plane mirror 89, a 1:1 lens 90 and a roof mirror 91 is optically coupled between the pattern 8 and the photosensitive tape 1. Since both tape 1 and pattern 8 are driven by the same motor 82, there is no need for phase-locked loops of the type described above. Furthermore, by using a cylindrical drum 81 having in its longitudinal direction a first cylindrical surface of diameter $D_1$ and the second cylindrical surface of diameter $D_2$ for respectively carrying the pattern 8 and the tape 1, magnifications given by:

$$M = \frac{D_2}{D_1}$$

are implemented. As described in connection with the other embodiments, the pattern 8 may be formed according to the above-described methods.

In all of the above illustrative embodiments of the present invention, the photosensitive tape 1 may be a photoresist coated copper tape or a photoresist coated continuous metal-composite tape. Use of either negative photoresists or positive photoresists is within the spirit and scope of the invention. After patterning the photosensitive copper tape by using any of the above-described method and apparatus, the copper is etched where exposed (if positive resist is used) leaving a set of thin copper leads suitable for "gang" or simultaneous bonding to a chip.

It is to be understood that the embodiments described herein are merely illustrative of the method and apparatus according to the present invention. Various modifications may be made thereto by persons skilled in the art without departing from the spirit and scope of the invention.

What is claimed is:

1. Method for continuously patterning a photosensitive tape comprising the steps of;
   continuously projecting onto said tape a predetermined endless pattern that is defined entirely on the cylindrical surface of a transparent cylindrical body;
   translating said tape at a predetermined speed between a tape-feeding means and a tape-receiving means;
   rotating said body at said predetermined speed via a direct drive to synchronously lock the movements of said body and said tape to each other;
   optically coupling an optical system between said pattern and said tape; and
   illuminating said pattern through said transparent body for continuously projecting an image of said pattern onto said tape via said optical system:
   wherein said optical system is characterized by a high-precision lens resolution relative to the surface of said tape, and the movements of said body and said tape are synchronously locked to each other by means of electrical circuit locking techniques to within the lens resolution of said optical system.

2. Method for continuously patterning a photosensitive tape according to claim 1, wherein the translating step comprises the step of engaging said tape on a cylindrical drum having its axis parallel to the axis of said cylindrical transparent body.

3. Method for continuously patterning both sides of a photosensitive tape comprising the steps of:
   continuously projecting onto the respective sides of said tape predetermined endless patterns respectively defined entirely on the cylindrical surfaces of first and second cylindrical transparent bodies;
   translating said tape at a predetermined speed between a tape-feeding means and a tape-receiving means;
   rotating said first body at said predetermined speed via a direct drive;
   optically coupling a first optical system between said first pattern and one side of said tape;
   rotating said second body at said predetermined speed via a direct drive;
   optically coupling a second optical system between said second pattern and the other side of said tape;
   synchronously locking the movements of said bodies and said tape to each other; and
   illuminating said first and second patterns through said first and second bodies, respectively, for continuously projecting correspondingly positioned images of said patterns simultaneously onto respective oppositely aligned sides of said tape via said first and second optical systems, respectively.

4. Method for continuously patterning both sides of a photosensitive tape comprising the steps of:
   continuously transferring onto the respective sides of said tape first and second predetermined endless patterns respectively defined entirely on the cylindrical surfaces of first and second cylindrical transparent bodies;
   rotating said first body at a predetermined speed via a direct drive;
   rotating said second body at said predetermined speed via a direct drive;
   engaging one side of said tape onto said second pattern;
   synchronously locking the rotations of said bodies to each other;
   optically coupling an optical system between said first pattern and the other side of said tape; and
   illuminating said first and second patterns through said first and second bodies, respectively, for continuously projecting an image of said first pattern onto said other side of said tape via said optical system and for simultaneously contact printing a correspondingly positioned image of said second pattern onto said one side of said tape at a position oppositely aligned with respect to said projected image.

5. Apparatus for continuously patterning a photosensitive tape comprising:
   means for continuously translating the photosensitive tape in a predetermined direction at a predetermined speed between a tape-feeding means and a tape-receiving means;
   a cylindrical transparent body having its longitudinal axis perpendicular to said predetermined direction and its cylindrical surface adapted to have defined thereon in fixed relationship with respect to said body the entire extent of a first predetermined endless pattern to be projected;
   means, including a direct drive for said cylindrical body, for synchronously coupling said translating means and said body via electrical locking circuitry such that said pattern continuously rotates at said predetermined speed; and
   an optical system for projecting an image of said pattern onto said tape, whereby the movement of a projected image is in said predetermined direction; said optical system being characterized by a high-precision lens resolution relative to the surface of said tape, and said coupling means including said electrical circuitry serving to lock the movements of said tape and said pattern to each other within said lens resolution.

6. Apparatus for continuously patterning a photosensitive tape according to claim 5, wherein said optical system is positioned between said cylindrical surface and said translating means.

7. Apparatus for continuously patterning a photosensitive tape according to claim 6, wherein said optical system comprises:
   a plano-convex lens and a concave spherical mirror having substantially coincident centers of curvature; and a pair of right-angle prisms each having one surface cemented to said plano-convex lens and another surface perpendicular to said one surface and parallel to said longitudinal axis.

8. Apparatus for continuously patterning a photosensitive tape according to claim 7, wherein said translating means comprises a cylindrical drum having its axis parallel to the longitudinal axis of said cylindrical transparent body.

9. Apparatus for continuously patterning a photosensitive tape according to claim 8 wherein said cylindrical drum is made of transparent material.

10. Apparatus for continuously patterning a photosensitive tape according to claim 9 wherein said drum comprises on its cylindrical surface a second predetermined pattern.

11. Apparatus for continuously patterning a photosensitive tape according to claim 5, wherein said first predetermined pattern is a portion of a film wrapped around said cylindrical surface.

12. Apparatus for continuously patterning a photosensitive tape according to claim 5, wherein said predetermined pattern is directly formed on said cylindrical surface.

13. Apparatus for continuously patterning a photosensitive tape comprising:
   a cylindrical transparent drum having along the direction of its longitudinal axis a first cylindrical surface portion adapted to receive the entire extent of a predetermined endless pattern to be projected and a second cylindrical surface portion;
   means exclusive of said tape, including a direct drive for said drum, for continuously rotating said cylindrical drum at a predetermined speed and in a predetermined direction;
   means for engaging the photosensitive tape on said second cylindrical surface portion in said predetermined direction; and
   an optical system, including optical elements mounted within said drum, coupled between said tape and said pattern for illuminating the inner surface of said pattern and for projecting an image of said pattern onto said tape, whereby the movement of the projected image is in said predetermined direction.

14. Apparatus for continuously patterning a photosensitive tape according to claim 13, wherein the magnification of the optical system is equal to the ratio of the diameter of said second surface portion to the diameter of said first surface portion.

* * * * *